A. A. CANTON.
SPEEDOMETER.
APPLICATION FILED JULY 1, 1914.
1,224,707.
Patented May 1, 1917.
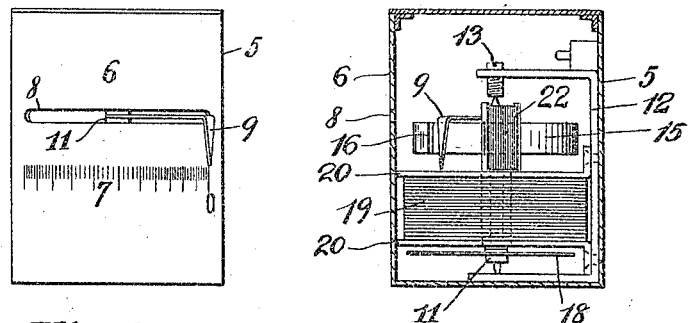
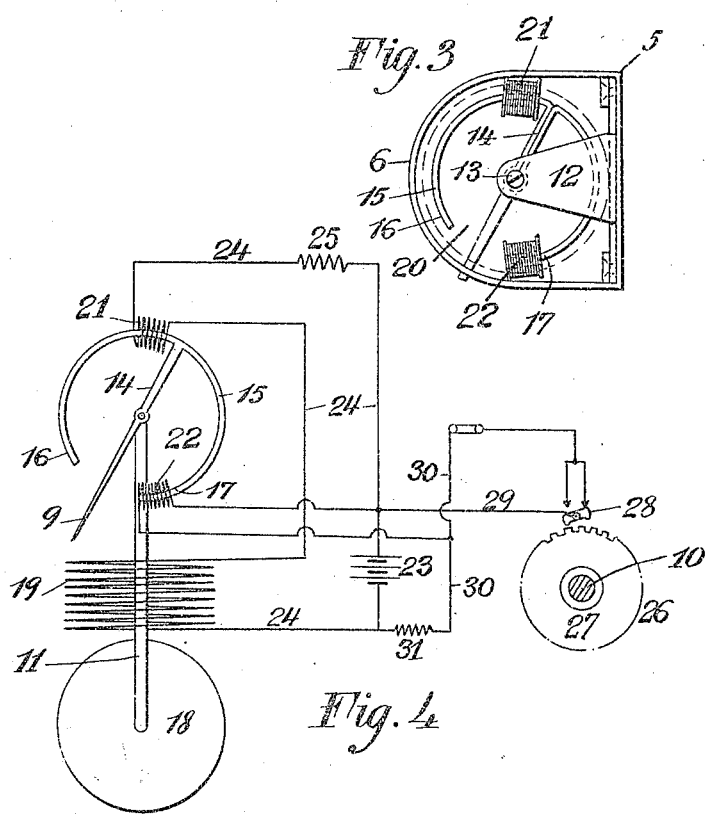
Witnesses:
Henry J. Lucke
K. G. LeCard
Allen A. Canton Inventor
By his Attorney
Ivan E. A. Konigsberg

UNITED STATES PATENT OFFICE.

ALLEN A. CANTON, OF NEW YORK, N. Y., ASSIGNOR TO THE DEVICE TESTING COMPANY, A CORPORATION OF CONNECTICUT.

SPEEDOMETER.

1,224,707. Specification of Letters Patent. Patented May 1, 1917.

Application filed July 1, 1914. Serial No. 848,348.

*To all whom it may concern:*

Be it known that I, ALLEN A. CANTON, a citizen of the United States of America, and a resident of the city, county, and State of New York, have invented certain new and useful Improvements in Speedometers, of which the following is a specification.

This invention relates to speedometers. The object of the invention is to provide a speedometer adapted to be made small and compact and at the same time of great efficiency, comprising but a few parts so that it may be manufactured and sold at a low price. Another object of the invention is to improve the construction of speedometers generally with a view of greater efficiency and greater range of usefulness. With these and other objects in view the invention comprises a speedometer as illustrated in the accompanying drawing and described in the following specification. In the drawing—

Figure 1 is a front elevation of the speedometer.

Fig. 2 is a side view with the casing in section.

Fig. 3 is a top view, and

Fig. 4 is a wiring diagram.

The reference numeral 5 denotes a casing of suitable size and form adapted to contain and support the various parts of the instrument. The front portion 6 is preferably semi-circular in form and bears a scale 7. 8 is a slot in the front portion 6 through which projects the indicator or pointer 9 which indicates on the scale the speed of the movable element, as for instance the shaft 10 in Fig. 5 which it is desired to measure.

The pointer 9 is secured to an iron spindle 11 which is pivoted in a frame 12 secured in the casing by screws or otherwise. 13 is a bearing screw for regulating the friction between the spindle and the frame.

The pointer 9 is secured to the spindle 11 in prolongation of a radial arm 14 by means of which arm a circular magnet 15 is also secured to the spindle. The poles 16 and 17 of the magnet 15 are disposed an equal distance from the pointer 9 as shown. To the bottom of the spindle there is secured a soft iron disk 18.

The spindle 11 forms the core of an electro-magnet the coil of which is marked 19. The spindle is free to move within the coil, which is mounted between two supports 20 secured to the frame 12. The coil 19, when current is sent through it, serves to magnetize the spindle 11 and thereby increase the strength of the magnet 15. The disk 18 is for the purpose of lowering the reluctance of the magnetic circuit from the magnet 15 when the coil 19 is energized.

The spindle 11 and with it the pointer 9 are operated by two solenoids 21 and 22 mounted upon the upper support 20 and which solenoids are hollow so as to permit the magnet 15 to pass through them and oscillate with the spindle 11. The solenoids are wound in such a manner that they have a tendency to repel the poles 16 and 17 of the magnet when current passes through them. They are further made of different magnetic strength, and in this instance the solenoid 21 is the weakest.

Referring now to the diagram in Fig. 4, the numeral 23 represents a source of electric energy such as a battery for instance. The solenoid 21 is connected across the battery and in series with the coil 19 by way of the circuit 24, 24. 25 is a resistance which serves as a means of weakening the solenoid 21 with respect to the solenoid 22, or the resistance may be omitted and the solenoid 22 be provided with a greater number of ampere turns, if desired.

The solenoid 22 is connected across the battery and in series with a magnetic interrupter 26 comprising a toothed magnetized disk 27, secured to the shaft 10, the speed of which is to be measured, and an oscillating armature 28 which is magnetized with a magnetism of a polarity opposite to that of the disk 27. When the shaft 10 is at rest, the solenoid is shortcircuited by way of the interrupter and the circuit 29 and 30. 31 is a resistance to prevent shortcircuiting of the battery as will be understood.

It follows, that the coil 19 and the solenoid 21 are always charged and as a consequence the solenoid 21 repels the pole 16 of the magnet as shown and moves the pointer 9 into zero position.

When the shaft 10 commences to rotate, the armature 28 is oscillated which momentarily interrupts the circuit 29—30 and permits a current impulse to pass through the solenoid 22. The faster the shaft 10 rotates, the faster the current impulses pass through solenoid 22, thereby building up the magnetism of the latter in proportion to the frequency and duration of the current impulses and the interruptions thereof, it being understood that the parts are so timed and arranged that the periods of current impulse are greater than those of interruption. It follows, that the solenoid 22 commences to repel the pole 17 and gradually turns the magnet 15 and the spindle a distance in proportion to the frequency of the impulses, or in other words, in proportion to the speed of the shaft 10, which speed may then be read on the scale 7 by means of the indicator 9. When the shaft 10 ceases to move the pointer is moved back to zero position by the solenoid 21 repelling the pole 16 of the magnet. The movements of the pointer are limited by the slot 8.

From the foregoing it will be seen that I have provided a small efficient speedometer which operates with great accuracy because the indicating means, that is the pointer as fixed with relation to the magnet 15, is operated in response to the frequency of the current impulses only, which are in direct proportion to the speed of the shaft 10. This instrument possesses a further advantage in that a variation in the voltage does not affect its accuracy because both solenoids are equally affected.

I have found this instrument to work accurately in actual practice, and that it works better with than without the coil 19. Changes in the detailed construction may be made without departing from the principle of the invention on the scope of the appended claims.

I claim:—

1. A speedometer comprising a pair of solenoids of different magnetic strength, a magnet mounted to move in response to the said difference of magnetic strength, a spindle upon which the said magnet is supported, a coil of wire around said spindle and means for supplying current to the latter and the said two solenoids.

2. A speedometer comprising a pair of solenoids of different magnetic strength, a magnet mounted to move in response to the said difference of magnetic strength, a spindle upon which the said magnet is supported, a source of electric energy, connections between the latter and the said two solenoids and a coil of wire surrounding the said spindle and connected in series with one of the said coils.

3. A speedometer comprising a pair of solenoids of different magnetic strength, a magnet mounted to move in response to the said difference of magnetic strength, a spindle upon which the said magnet is supported, a coil of wire around said spindle, means for supplying a constant electric current to the said coil of wire and the one solenoid, and means for supplying an intermittent current to the other solenoid.

4. A speedometer comprising a movably mounted magnet, a pair of solenoids for operating said magnet, means for indicating the movement of the latter, movable supporting means for said magnet, a coil of wire surrounding said supporting means and means for supplying current to the said coil of wire and the said solenoids.

5. A speedometer comprising a pair of solenoids of different magnetic strength, a magnet mounted to move within said solenoids and in response to their different magnetic strength, a source of electric energy, connections between the latter and the said solenoids and electro-magnetic means for strengthening the magnetism in said magnet and connected to the said source of energy.

6. A speedometer comprising a casing, a hollow coil of wire supported in the same, a spindle movably supported within said coil, a magnet secured to said spindle at the one end thereof, a soft iron disk secured to the spindle at the opposite end, a pair of solenoids supported in fixed relation to said magnet and surrounding the same, a pointer secured to said spindle to indicate the movement of the said magnet and means for limiting the movements of the pointer.

Signed at New York, N. Y., this 30th day of June, 1914.

ALLEN A. CANTON.

Witnesses:
 IVAN KONIGSBERG,
 R. G. LEARD.